United States Patent [19]

Gellert

[11] Patent Number: 4,777,348

[45] Date of Patent: Oct. 11, 1988

[54] INJECTION MOLDING PROBE WITH INSULATION AND LOCATING HOOP PORTION

[76] Inventor: Jobst U. Gellert, 7A Prince Street, Georgetown, Ontario, Canada, L7G 4X5

[21] Appl. No.: 86,845

[22] Filed: Aug. 19, 1987

[51] Int. Cl.⁴ ........................................... F27B 14/00
[52] U.S. Cl. .................................. 219/421; 219/523; 425/549
[58] Field of Search ................ 219/421, 523; 425/549, 425/568, 570, 573, 588

[56] References Cited

U.S. PATENT DOCUMENTS

| | | | |
|---|---|---|---|
| 4,120,086 | 10/1978 | Crandell | 219/510 X |
| 4,376,244 | 3/1983 | Gellert | 219/523 |
| 4,576,567 | 3/1986 | Gellert | 425/549 |
| 4,611,394 | 9/1986 | Gellert | 219/611 |
| 4,648,546 | 3/1987 | Gellert | 228/161 |
| 4,669,971 | 6/1987 | Gellert | 425/549 |

FOREIGN PATENT DOCUMENTS 1174020  9/1984  Canada .

Primary Examiner—C. L. Albritton
Attorney, Agent, or Firm—Riches, McKenzie & Herbert

[57] ABSTRACT

An integral heated probe for an injection molding system. The hoop has an insulation and locating hoop portion which bridges an insulative air space and abuts against a circumferential shoulder to accurately locate the probe in a well in the cavity plate. The hoop portion encloses a number of adjacent insulative air chambers which extend circumferentially in the steel body. The hoop portion is brazed in place in a vacuum furnace to be an integral part of the probe. Thus, it provides additional hoop or bursting strength and the air chambers reduce the heat loss through the hoop portion to the cooled cavity plate.

4 Claims, 4 Drawing Sheets

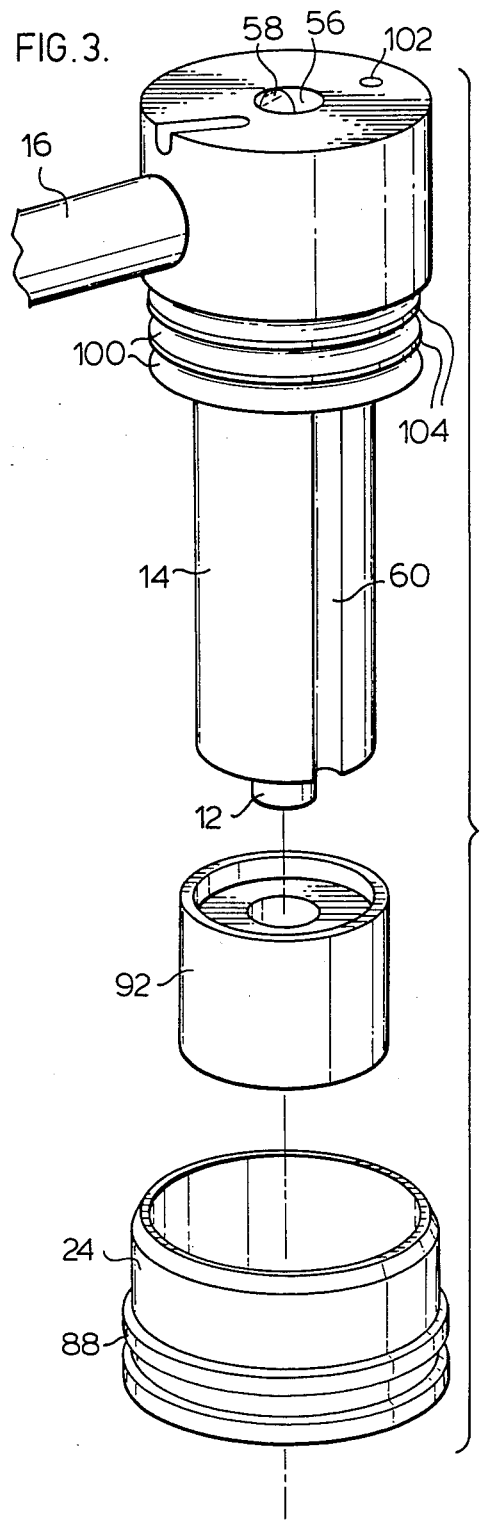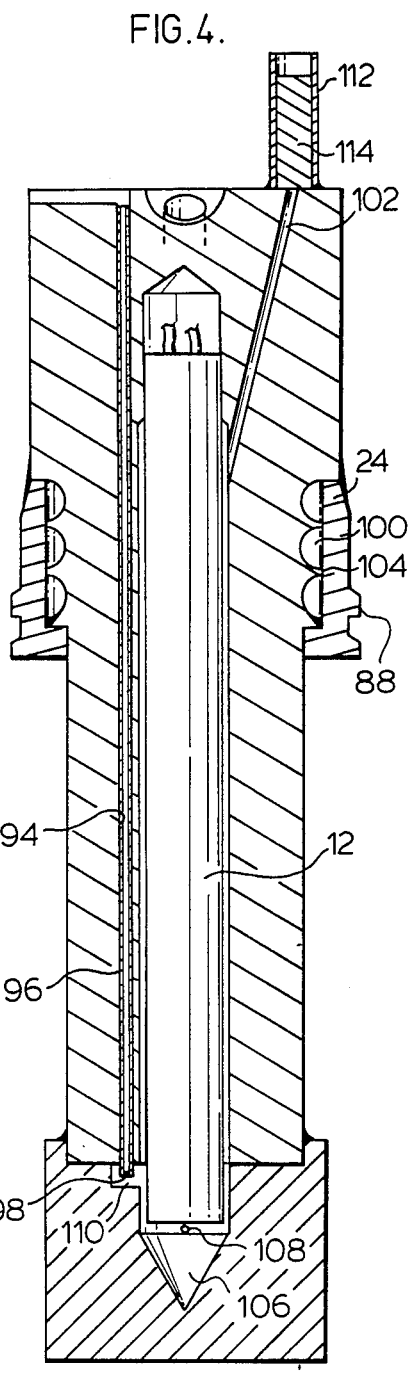

INJECTION MOLDING PROBE WITH INSULATION AND LOCATING HOOP PORTION

BACKGROUND OF THE INVENTION

This invention relates to an integral heated probe for an injection molding system which has an insulation and locating hoop portion which encloses circumferential air chambers and seats in the cavity plate to accurately locate the probe.

Heated probes are well known in the injection molding industry. An early example is shown in U.S. Pat. No. 4,120,086 to Crandell entitled "Method of Making Electrically Heated Nozzle" which issued Oct. 17, 1978. Another example is shown in the applicant's U.S. Pat. No. 4,376,244 entitled "Injection Molding Heated Probe" which issued Mar. 8, 1983 which describe a heated probe mounted in a fixed position in a well in the cavity plate with the melt flowing around it to the gate. The applicants's U.S. Pat. No. 4,611,394 entitled "Method of Manufacture of an Injection Molding Integral Heated Probe" which issued Sept. 6, 1986 discloses a method of making probes with external longitudinally extending melt channels. Another probe is shown in Japanese Utility Patent Application No. 57-69184 to Yoshida filed Oct. 11, 1980. The applicant's U.S. Pat. No. 4,576,567 entitled "Injection Molding System Having an Insulation Sleeve" which issued Mar. 18, 1986 shows a further improvement wherein a thermoplastic insulating sleeve having matching channels fills the space around the nozzle. More recently, the applicant's U.S. Pat. No. 4,669,971 entitled "Valve Gated Probe" which issued June 2, 1987 shows a system in which a number of probes are fixed to a common manifold and actuated together to provide valve gating. While these previous probes are satisfactory for many applications, there are disadvantages which arise with high pressure and/or high temperature molding. As shown for instance in the applicant's U.S. Pat. No. 4,576,567 referred to above, it is well known to locate the nozzle in a well in the cavity plate by having a hollow cylindrical insulation bushing. However, where the melt bores pass beneath the insulation bushing, there is a relatively thin wall section which can burst if the injection pressure is too high. Furthermore, there is considerable heat loss through the insulation bushing to the cooled cavity plate which is not acceptable if uniform melt temperature is critical. In some cases, the insulation bushing which contacts the cavity plate is made of a titanium alloy to reduce the heat loss problem, but it still exists.

SUMMARY OF THE INVENTION

Accordingly, it is an object of the present invention to at least partially overcome the disadvantages of the prior art by providing a heated nozzle having an integral insulation and locating hoop portion which encloses circumferential air chambers and seats in the cavity plate to locate the probe.

To this end, in one of its aspects, the invention provides an integral elongated heated injection molding probe to be seated in a well in a cooled cavity plate, the well having an inner surface with a circumferential shoulder and extending to a gate leading to a cavity, the probe having an elongated heater extending centrally in an elongated steel body, the body having an outer surface, a rear end and a pointed forward end, the heater having a terminal extending out through an opening on the body, the body having at least one melt bore extending from a central inlet at the rear end to connect to a melt channel extending longitudinally in the outer surface towards the forward end, having the improvement wherein the body has an integral locating hoop portion which seats against the circumferential shoulder of the well to locate the nozzle with the pointed forward end in alignment with the gate, the locating hoop portion enclosing at least one insulation chamber extending circumferentially in the steel body to reduce heat loss through the hoop portion to the cooled cavity plate.

Further objects and advantages of the invention will appear from the following description taken together with the accompanying drawings.

BRIEF DESCRIPTION OF THE DRAWINGS

FIG. 3 is an isometric view and FIG. 4 is a sectional view which illustrate the steps involved in making the probe shown in FIG. 1.

DETAILED DESCRIPTION OF THE DRAWINGS

Figure 1:
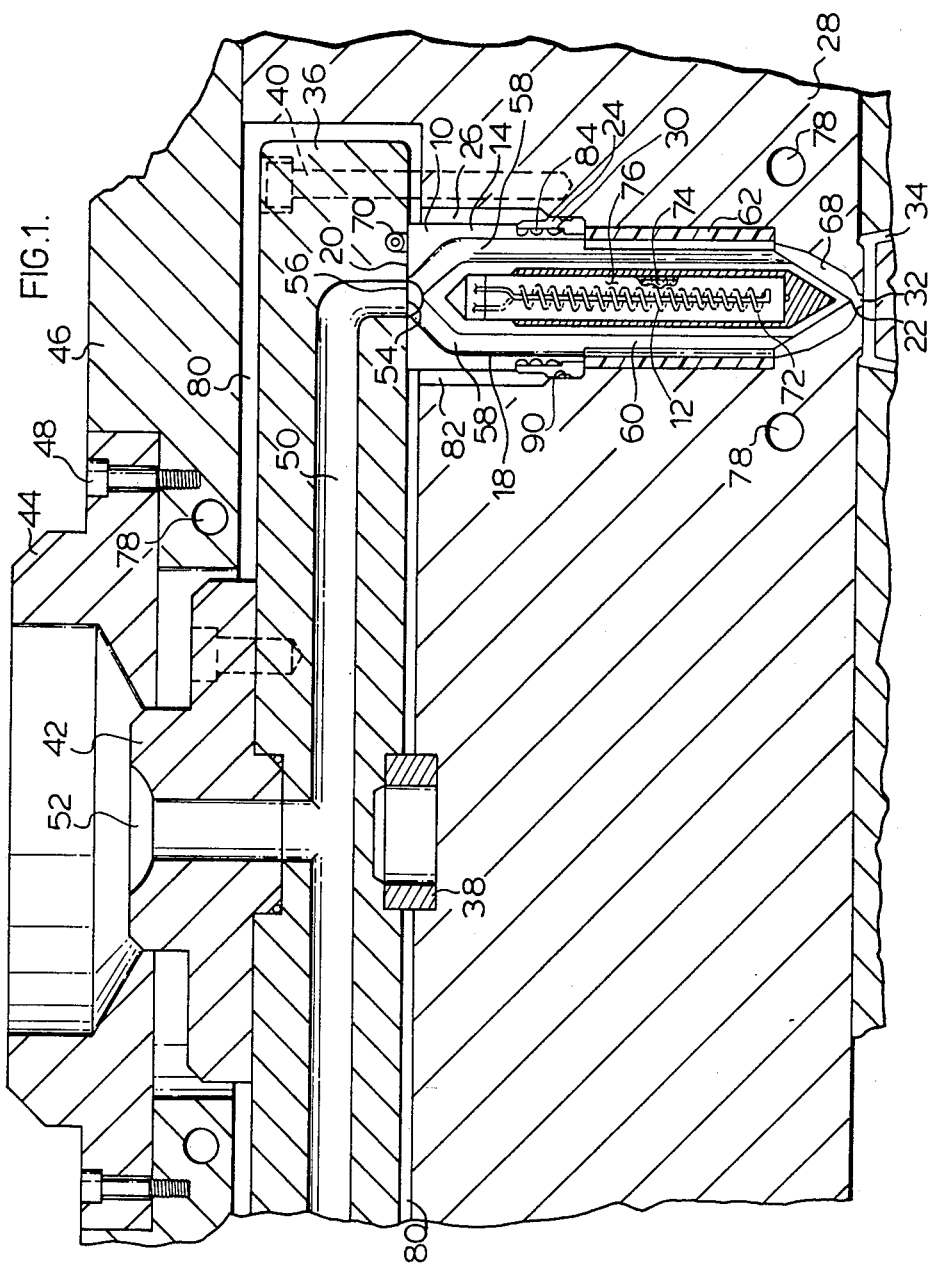
FIG. 1 is a sectional view of a portion of a multi-cavity injection molding system showing one probe according to a preferred embodiment of the invention.
Figure 2:
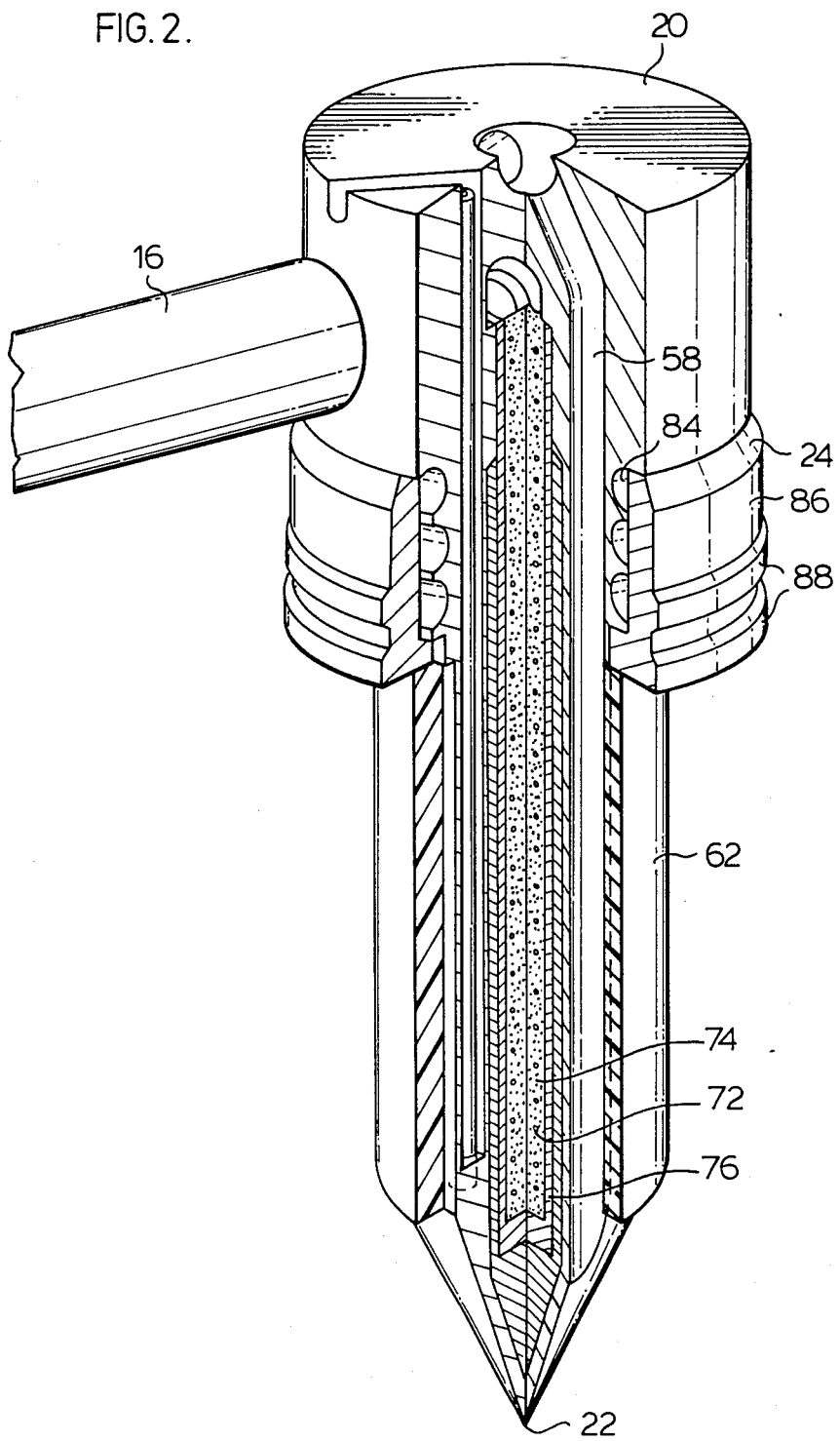
FIG. 2 is a cut-away isometric view showing the probe seen in FIG. 1 in greater detail.

Reference is first made to FIG. 1 which shows a portion of a multi-cavity injection molding system having a number of elongated heated probes 10 according to one embodiment of the invention. Each probe has an electrical cartridge heater 12 which is centrally located in a body 14 made of a tool steel such as H13 with a cold terminal 16 which extends laterally out through an opening in the body (shown in FIGS. 2 and 3). The body 14 has an outer surface 18, a rear end 20 and a pointed forward end 22. As described in greater detail below, the probe 10 has an integral insulation and locating hoop portion 24 which is also made of a tool steel such as H13. Each probe 10 is seated in a well 26 in the cavity plate 28 with the hoop portion 24 resting on a circumferential shoulder 30 to locate the pointed forward end 22 in alignment with a gate 32 extending through the cavity plate 28 to a cavity 34. The probes 10 are held securely in this position by a manifold 36 which is positioned by central locating ring 38 and secured by bolts 40 to abut tightly against the rear ends 20 of the probes 10. A manifold extension 42 is, in turn, held in position by screws and a locating collar 44 fastened to the back plate 46 by screws 48.

Figure 5:
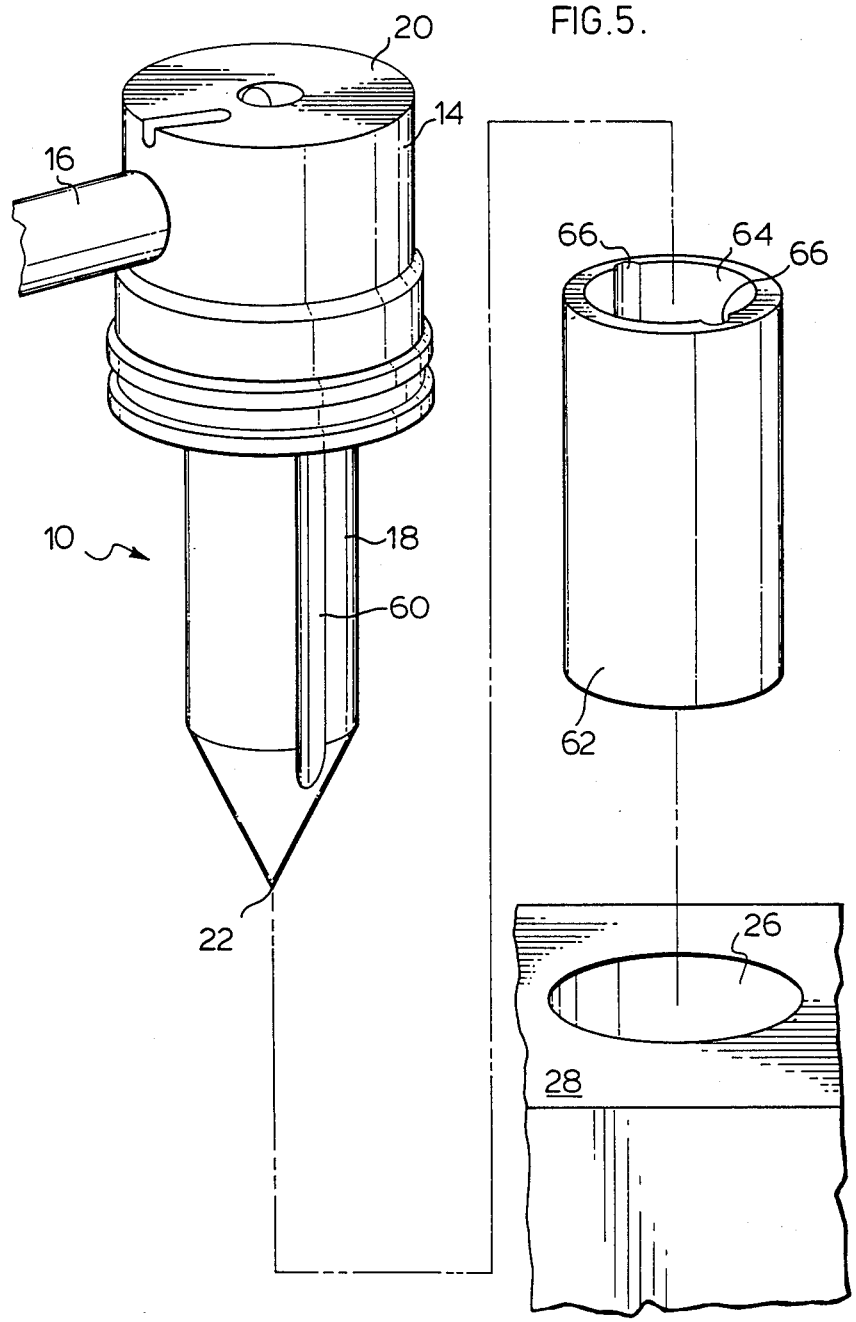
FIG. 5 is an isometric view showing the probe and sleeve in position to be inserted into a well in the cavity plate.

A melt passage 50 extends from a recessed inlet 52 in the manifold 36 to receive pressurized melt from a molding machine (not shown) and convey it through each probe 10 to the gates 32 and into the cavities 34. As can be seen, the melt passage 50 branches in the manifold 36 to a number of spaced outlets 54. In order to provide balanced melt flow to each outlet 54, the manifold 36 is made using two plates by the method described in the applicant's U.S. Pat. No. 4,648,546 entitled "Composite Plate Method of Manufacturing Injection Molding Manifold" which issued Mar. 10, 1987. Each outlet 54 from the manifold 36 is in alignment with a common central inlet 56 on the rear end 20 of a probe 10 to a pair of melt bores 58. The melt bores 58 connect respectively to a pair of melt channels 60 extending longitudinally on opposite sides of the outer surface 18 of the probe body 14. The probe 10 is made to provide a space between its outer surface 18 and the inner surface 64 of the well 26 in which it is seated. As more clearly shown in FIG. 5, this space is filled by a thermoplastic insulating sleeve 62 which prevents the space from filling with melt and also provides good insulation. As described in the applicant's U.S. Pat. No. 4,576,567 and 4,669,971 mentioned above, this sleeve 62 can be made of TEFLON (Trade Mark of DuPont for polyetrafluoroethylene), glass-filled NYLON or polyetheretherketone (PEEK). It has an inner surface 64 with a pair of grooves 66 which match and are aligned with the melt channels 60 on the outer surface 18 of the probe body 14 to form a portion of the melt passage 50 extending along opposite sides of each probe 10. Of course, the pressurized melt from the molding machine flows through the melt passage 50 from the inlet 52, branches in the manifold 36 to each probe 10 along the sides of each probe 10 to a space 68 surrounding the pointed forward end 22 of the probe 10, and then through the gate 32 into the cavity 34.

It is critical to the successful operation of the system that the melt be maintained within a narrow temperature range as it flows through the melt passage 50. Thus, the manifold 36 is heated to a predetermined temperature by an electrical heating element 70 which is cast into it as described in the applicant's Canadian Pat. No. 1,174,020 entitled "Injection Molding Manifold Member and Method of Manufacture" which issued Sept. 11, 1984. Each probe 10 is heated by a cartridge heater 12 which is cast into it as described in detail in the applicant's U.S. Pat. No. 4,611,394, referred to above. Each cartridge heater 12 has a resistance wire 72 extending through a refractory powder 74 such as magnesium oxide inside a steel casing 76. The outer casing 76 is usually swaged to compress the magnesium oxide around the heating wire 72 to improve heat transfer. Cooling water is pumped through conduits 78 to cool the cavity plate 28 and the back plate 46. In order to reduce heat loss from the heated manifold 36 to the adjacent cooled cavity plate 28 and back plate 46, an insulative air space 80 is provided between them. Similarly, as mentioned above, insulating sleeve 62 is located between each heated probe 10 and the surrounding cooled cavity plate 28, and another insulative air space 82 is provided around the upper portion of each probe 10. Thus, the only metal to metal contact between the heated probe 10 and the cooled cavity plate 28 is through the insulation and locating hoop portion 24 which seats on shoulder 30 to accurately locate the probe 10 in the well 26. However, as clearly seen in FIG. 2, the hoop portion 24 encloses a number of adjacent circumferential chambers 84 which provide insulation against the loss of heat through the hoop portion 24. Integrally brazing the hoop portion 24 in place, as described below, not only seals the insulation chamber 84, but also adds additional hoop or bursting strength to the critical thin areas where the melt bores 58 pass beneath the air chambers 84. As can also be clearly seen in FIG. 2, the outer surface 86 of the hoop portion 24 is made to have ridges 88 which further reduce the heat loss where they abut against the inner surface 90 of the well 26.

A previous method of making an injection molding probe is described in detail in the applicant's U.S. Pat. No. 4,611,394 referred to above. The present improved method will now be described with particular reference to FIGS. 3 and 4. The body 14 of the probe 10 is machined with a separate nose portion 92 and hoop portion 24. The cylindrical body 14 is drilled to receive the cartridge heater 12 and also to provide the pair of melt bores 58 which extend from the central inlet 56. A separate thermocouple bore 94 is also drilled to receive a small diameter sleeve 96 with a closed forward end 98. The outer surface 18 of the body 14 is machined to provide a series of adjacent circumferentially extending grooves 100 and the forward portion is reduced in diameter to form the open melt channels 60. A filler duct 102 is drilled diagonally from the rear end of the body 14. Nickel brazing paste is applied around the lands 104 between the grooves 100. The cartridge heater 12 is inserted into the body 12, and the nose portion 92 and hoop portion 24 are assembled as shown in FIG. 4. The nose portion 92 is made with a conical shaped cavity 106 and is bridged by a spacer pin 108 to hold the cartridge heater 12 in place. The cavity 106 has a small offset portion 110 which receives the closed end 98 of the thermocouple sleeve 96.

Following assembly, nickel brazing paste is applied to the joints between the body 14, the nose portion 92 and the hoop portion 24. A hollow filler tube 112 is positioned on the rear end 20 of the body 14 in communication with the filler duct 102. Brazing paste is applied to the base of the filler tube 112, as well as to seal around the upper portion of the cartridge heater 12 and around the thermocouple sleeve 96. The assembled probes 10 are then heated in batches in a vacuum furnace (not shown) which melts the nickel brazing compound at a temperature of about 2180° F. which causes it to run along the joints and brazes and seals them integrally together. In particular, the insulation and locating hoop portion 24 is integrally brazed at both sides as well as along the lands 104 to enclosed the grooves 100 to form sealed insulation chambers 84 and to provide additional bursting strength. After removal from the vacuum furance, a slug 114 of a predetermined amount of copper is inserted into each filler tube 112. They are reinserted into the vacuum furnace in the upright position and gradually heated to a temperature of about 2050° F. As the temperature is increased, the furnace is evacuated to a relatively high vacuum to remove substantially all of the oxygen. However, before the melting temperature of copper is reached, the vacuum is reduced by partially backfilling with an inert gas such as argon or nitrogen to avoid vapourization of the copper. When the copper melts, it runs down through the filler duct 102 to completely fill the space around the cartridge heater 12, including the conical cavity 106 in the nose portion 92 and the offset portion 110 around the closed end 98 of the thermocouple sleeve 96. As is known, casting the copper under a vacuum provides a metallurgical bonding of the copper to the steel and thus very efficiently transfers heat from the cartridge heater 12 and distributes it evenly along the melt passage through the probe 10. After casting, the probe is machined to remove the filler tube 112 and to form the pointed forward end 22. A thin drill is inserted into the thermocouple sleeve 96 to drill open the closed end 98 so that a thermocouple can be inserted to set in the copper in the offset portion 110 to accurately measure operating temperature adjacent the forward end of the probe.

In use, the system is assembled with a probe 10 leading to each gate 32 as shown in FIG. 1. Power is applied to heat the manifold 36 and the probes 10 to a predetermined operating temperature. Hot pressurized melt is then introduced into the melt passage 50 through the recessed inlet 52 from a molding machine (not shown) according to a predetermined cycle. The melt branches in the manifold 36 and again when it reaches the inlet 56 to each probe. Part of the melt flows through the bore 58 and channel 60 on each side of the probe 10 to the space 68 around the pointed forward end 22 of the probe 10. From there it flows through the gate 32 and fills the cavity 34. After the cavities 34 are full, injection pressure is held for a short packing period and then released. The mold is then opened to eject the product, and the process is repeated.

While the description has been given with respect to a particular embodiment, it is not to be construed in a limiting sense. Variations and modifications will occur to those skilled in the art. In particular, it is apparent that the configuration of the probe 10 could be different. The configuration of the insulation and locating hoop portion 24 and the insulation chambers 84 could also be different for different applications. Reference is made to the attached claims for a definition of the invention.

What I claim is:

1. In an integral elongated heated injection molding probe to be seated in a well in a cooled cavity plate, the well having an inner surface with a circumferential shoulder and extending to a gate leading to a cavity, the probe having an elongated electrical heater extending centrally in an elongated steel body, the body having an outer surface, a rear end and a pointed forward end, the heater having a terminal extending out through an opening in the body, the body having at least one melt bore extending from a central inlet at the rear end to connect to a melt channel extending longitudinally in the outer surface towards the forward end, the improvement wherein the body has an integral locating hoop portion which seats against the circumferential shoulder of the well to locate the nozzle with the pointed forward end in alignment with the gate, the locating hoop portion enclosing at least one insulation chamber extending circumferentially in the steel body to reduce heat loss through the hoop portion to the cooled cavity plate.

2. A probe as claimed in claim 1 wherein the hoop portion encloses a plurality of adjacent insulation chambers extending circumferentially in the body.

3. A probe as claimed in claim 2 wherein the hoop portion has an outer surface which abuts against the inner surface of the well.

4. A probe as claimed in claim 1 wherein the outer surface of the hoop portion is ridged to reduce heat loss.

* * * * *